Aug. 20, 1940.　　　A. KINDELMANN　　　2,211,827
FILM GATE ASSEMBLY
Filed Aug. 5, 1938

INVENTOR.
*Albert Kindelmann*
BY *Hastings W. Baker*
ATTORNEY.

Patented Aug. 20, 1940

2,211,827

UNITED STATES PATENT OFFICE 2,211,827

FILM GATE ASSEMBLY

Albert Kindelmann, Floral Park, N. Y., assignor to International Projector Corporation, New York, N. Y., a corporation of Delaware Application August 5, 1938, Serial No. 223,192

11 Claims. (Cl. 88—17)

A film gate assembly is movable toward or away from the fixed film trap as is well understood in the art. It is moved away from the film trap in order for the film to be threaded between the same and the film gate assembly is moved toward the film trap so that the film gate will engage the film and hold it in engagement with the film trap. It is also well known that the film gate is provided with an aperture through which the beam of light passes and that the film is guided before it reaches the aperture, while it is in exposed position at the aperture, and after it leaves the aperture. In the past it has been found that sometimes this film gate needs lateral adjustment relative to the fixed film trap, and it has heretofore been virtually impossible to make this adjustment easily. Frequently it has required grinding of parts and the expenditure of much labor in fitting and adjusting the gate plate relative to the film trap. The object of this invention is to provide means whereby such an adjustment may be easily and quickly made.

Figure 2:
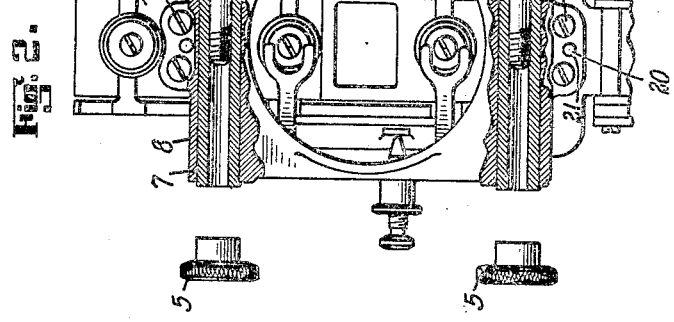
Figure 4:
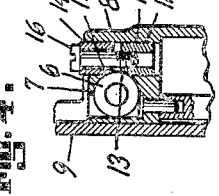
Figure 1:
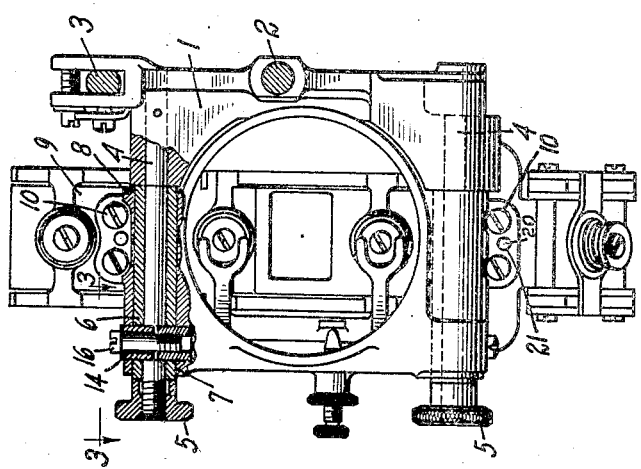
Figure 3:
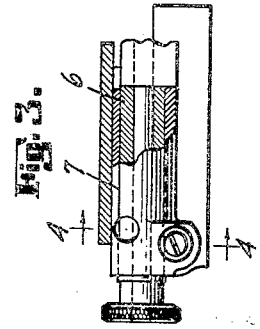

The invention may be better understood by referring to the attached drawing in which, Fig. 1 is a front view of the film gate assembly looking toward the rear of the projector, certain of the parts being shown in cross-section, Fig. 2 is a similar view but showing the film gate partly removed from the film gate bracket, Fig. 3 is a fragmentary view on the line 3—3 of Fig. 1 looking in the direction of the arrows, and Fig. 4 is a fragmentary cross-sectional view on the line 4—4 of Fig. 3 looking in the direction of the arrows.

The film gate bracket 1 is slidably mounted on bars 2 and 3, being movable on said bars by mechanism which forms no part of this invention. The film gate bracket is provided with upper and lower bars 4 which are screw threaded at their outer ends and adapted to receive upper and lower nuts 5. Upper and lower bushings 6 are mounted on the bars 4 and extend within bores 7 of a sleeve 8 secured to the film gate 9 by means of screws 10.

The sleeve 8 is provided with a bore 11 in the upper portion thereof above the bar 4 and a similar bore in the lower portion below the bar 4, in which bores the holding means for the bushings are inserted. Since the holding means for the upper and lower portions are precisely the same, only one will be described. In this specification I have considered the sleeve 8 as a part of the film gate.

The bore 11 partly intersects the bore 7; that is if you took the outer circumference of the bore 7 which would be a circle and the vertically extending line through the portion of the bore 11 nearest to the center of the bore 7, that line would intersect the said circle, as is clearly shown in Fig. 4. In the bore 11 is an internally threaded plug 12 provided with an arcuate surface 13 adapted to engage the bushing 6. Also extending within the bore 11 is a similar but unthreaded plug 14 having a similar arcuate surface 15 adapted to contact the upper portion of the bushing 6. A screw 16 is passed through the plug 14 and screwed into the plug 12. The further the screw is screwed into the plug 12, the more it will move these two plugs together and the tighter the two plugs will grip the bushing 6. In Fig. 4, I have shown the means gripping the upper bushing 6, but as above stated, the means for gripping the lower bushing 6 is precisely the same except that, of course, the parts would be turned upside down from the position shown in Fig. 4; that is the screw would be screwed upwardly and the threaded plug would be on the top and the unthreaded one on the bottom.

Suppose we have the parts in the position shown in Fig. 1, but it is found that the film gate should be moved to the left for a short distance. In order to make this adjustment the operator would unscrew the two screws 16, or at least should loosen them so that the arcuate surfaces 13 and 15 would no longer grip the bushings. The inner ends of the bushings would remain in contact with the faces 17 of the film gate bracket and with the said bushings remaining stationary, the operator would pull outwardly or to the left as viewed in Fig. 1 on the film gate assembly until he has moved it into the desired position. It is not necessary to remove the nuts 5 before commencing this operation. After having moved the film gate into the desired position he would then tighten the two screws 16 so as to bring the arcuate surfaces 13 and 15 of the plugs into gripping engagement with the bushings. In this simple manner he would have adjusted the film gate into the desired position. In like manner, if he wished to adjust it inwardly he would perform the same operation except that he would move it inwardly to the desired position.

If he desires to remove the film gate entirely, all that would be necessary would be to remove the nuts 5 and slip the entire film gate and bushings to the left as viewed in Fig. 2.

The essential object of the invention, therefore, is to provide a film gate assembly which may be readily adjusted relative to the film trap and which may be locked in a simple manner in its adjusted position.

The film gate is provided with two dowel pins 20 and the film gate bracket is provided with two holes 21 adapted to receive the said dowel pins. In positioning the film gate on the film gate bracket, the dowel pins would be passed into said holes so as to accurately position the film gate relative to the film gate bracket and the screws 10 would then be inserted and tightened.

I realize that many changes may be made in the invention without departing from the spirit thereof and I, therefore, desire to claim the same broadly except as I may limit myself in the appended claims.

Having now described my invention, I claim:

1. In a film gate assembly, a film gate bracket, a laterally extending bar carried by said bracket, a bushing adapted to be placed in a fixed position on said bar and abutting said bracket, a film gate adjustably mounted on said bushing, means to hold the gate in adjusted position on the bushing and means whereby said bushing may be locked on said bar.

2. In a film gate assembly, a film gate bracket, a laterally extending bar carried by said bracket, a film gate, a sleeve carried thereby, a bushing interposed between said bar and sleeve and means to lock said bushing relative to said sleeve.

3. In a film gate assembly, a film gate bracket, a laterally extending bar carried by said bracket, a film gate, a sleeve carried thereby, a bushing interposed between said bar and sleeve, means to lock said bushing relative to said sleeve, and other means to prevent lateral movement of said bushing relative to the bracket.

4. In a film gate assembly, a film gate bracket, a laterally extending bar carried by said bracket, a film gate, a sleeve rigidly carried thereby, a bushing interposed between said bar and sleeve and clamping means to lock said bushing relative to said sleeve.

5. In a film gate assembly, a film gate bracket, a laterally extending bar carried by said bracket, a film gate, a sleeve rigidly carried thereby, a bushing interposed between said bar and sleeve, clamping means to lock said bushing relative to said sleeve, and a nut to prevent lateral movement of said bushing relative to the bracket.

6. In a film gate assembly, a bar, a bushing on said bar, a film gate mounted on said bushing, a sleeve carried by said film gate, a clamp to lock said bushing in adjusted position on said sleeve and means to secure said bushing on said bar.

7. In a film gate assembly, a bar, a bushing on said bar, a film gate, a sleeve carried by said film gate and mounted on said bushing, a clamp to lock said sleeve in adjusted position on said bar, said clamp consisting of two plugs extending into a bore of said sleeve and adapted to engage said bushing when the plugs are moved toward each other and means to move said plugs so as to clamp said bushing.

8. In a film gate assembly, a bar, a bushing on said bar, a film gate, a sleeve carried by said film gate and mounted on said bushing, a clamp to lock said sleeve in adjusted position on said bar, said clamp consisting of two plugs extending into a bore of said sleeve and provided with arcuate surfaces adapted to engage said bushing.

9. In a film gate assembly, a bar, a bushing on said bar, a film gate, a sleeve carried by said film gate and mounted on said bushing, a clamp to lock said sleeve in adjusted position on said bar, said clamp consisting of two plugs extending into a bore of said sleeve, one of said plugs being internally threaded, said plugs being adapted to engage said bushing when the plugs are moved toward each other, and a screw passing through one of the bushings and engaging the other bushing having the screw threads so as to move said plugs toward each other to clamp said bushing.

10. In a film gate assembly, a bar, a bushing on said bar, a film gate, a sleeve carried by said film gate and mounted on said bushing, a clamp to lock said sleeve in adjusted position on said bar, said clamp consisting of two plugs extending into a bore of said sleeve, one of said plugs being internally threaded and the other plug having a plain bore, said plugs being adapted to engage said bushing when the plugs are moved toward each other and a screw adapted to be passed through the plain bore and engaging the threads on the threaded plug, a head on the screw so that as the screw is screwed inwardly its head will contact one end of the plug which has the plain bore while the threads of the screw engage the threads of the other plug whereby the plugs may be moved toward each other and into gripping engagement with the bushing.

11. In a film gate assembly, a film gate bracket, a laterally extending bar carried thereby, a bushing slidable on said bar, said bracket serving as a fixed stop for said bushing, means to lock said bushing on said bar so as to hold the bushing against said bracket, a film gate laterally slidable on said bushing and means to lock said film gate on said bushing in any adjusted position.

ALBERT KINDELMANN.